United States Patent
Ran et al.

(10) Patent No.: US 7,716,569 B2
(45) Date of Patent: *May 11, 2010

(54) FRAMEWORK FOR PROVIDING VISUAL CONTEXT TO WWW HYPERLINKS

(75) Inventors: Shirli Ran, Savion (IL); Eldad Barnoon, Tel Aviv (IL); Yuval Yarom, Ra'anana (IL)

(73) Assignee: Girafa.com Inc., Wilmington, DE (US)

( * ) Notice: Subject to any disclaimer, the term of this patent is extended or adjusted under 35 U.S.C. 154(b) by 460 days.

This patent is subject to a terminal disclaimer.

(21) Appl. No.: 11/029,995

(22) Filed: Jan. 5, 2005

(65) Prior Publication Data

US 2005/0251736 A1     Nov. 10, 2005

Related U.S. Application Data

(63) Continuation of application No. 09/708,191, filed on Nov. 8, 2000, now Pat. No. 6,864,904.

(60) Provisional application No. 60/169,328, filed on Dec. 6, 1999.

(51) Int. Cl.
*G06F 17/00* (2006.01)
(52) U.S. Cl. .................. 715/207; 715/205; 715/208; 715/234
(58) Field of Classification Search ............ 715/205, 715/207, 208, 234
See application file for complete search history.

(56) References Cited

U.S. PATENT DOCUMENTS

| | | |
|---|---|---|
| 4,802,756 A | 2/1989 | Feinbloom |
| 5,164,381 A | 11/1992 | Wachter et al. |
| 5,502,178 A | 3/1996 | Gupta |
| 5,548,692 A | 8/1996 | Cok |
| 5,568,570 A | 10/1996 | Rabbani |
| 5,623,589 A | 4/1997 | Needham et al. |
| 5,675,507 A | 10/1997 | Bobo, II |
| 5,706,507 A | 1/1998 | Schloss |
| 5,715,416 A | 2/1998 | Baker |
| 5,752,244 A | 5/1998 | Rose et al. |
| 5,754,938 A | 5/1998 | Herz et al. |
| 5,761,436 A | 6/1998 | Nielsen |
| 5,761,686 A | 6/1998 | Bloomberg |

(Continued)

FOREIGN PATENT DOCUMENTS

CA     2 279 145     2/2000

(Continued)

OTHER PUBLICATIONS

Kopetzky T. et al., "Visual preview for link traversal on the world wide web", Computer Networks, Elsevier science Publishers B.V. Amsterdam, NL, vol. 31, No. 11-16, May 1999.

(Continued)

*Primary Examiner*—Adam M Queler
(74) *Attorney, Agent, or Firm*—Ladas & Parry LLP

(57) ABSTRACT

A method and a system for presenting Internet information to a user including providing to a user a visual image of a web page containing at least one hyperlink, and at least partially concurrently providing a visual image of another web page of at least one web site which is represented by the at least one hyperlink.

22 Claims, 11 Drawing Sheets

U.S. PATENT DOCUMENTS

| | | | |
|---|---|---|---|
| 5,765,176 A | 6/1998 | Bloomberg | |
| 5,781,785 A | 7/1998 | Rowe et al. | |
| 5,796,395 A | 8/1998 | de Hond | |
| 5,845,067 A | 12/1998 | Porter et al. | |
| 5,870,559 A | 2/1999 | Leshem et al. | |
| 5,933,137 A | 8/1999 | Anderson | |
| 5,940,075 A | 8/1999 | Mutschler et al. | |
| 5,963,964 A | 10/1999 | Nielsen | |
| 5,973,692 A | 10/1999 | Knowlton et al. | 345/348 |
| 5,991,809 A | 11/1999 | Kriegsman | |
| 5,999,664 A | 12/1999 | Mahoney et al. | |
| 6,009,442 A | 12/1999 | Chen et al. | |
| 6,011,537 A | 1/2000 | Slotznick | 345/115 |
| 6,016,494 A | 1/2000 | Isensee et al. | 707/102 |
| 6,017,157 A | 1/2000 | Garfinkle et al. | |
| 6,035,323 A | 3/2000 | Narayen et al. | |
| 6,054,989 A | 4/2000 | Robertson et al. | |
| 6,069,655 A | 5/2000 | Seelev et al. | |
| 6,073,168 A | 6/2000 | Mighdoll et al. | |
| 6,101,510 A | 8/2000 | Stone et al. | 707/513 |
| 6,108,703 A | 8/2000 | Leighton et al. | |
| 6,119,135 A | 9/2000 | Helfman | |
| 6,144,962 A | 11/2000 | Weinberg et al. | |
| 6,154,755 A | 11/2000 | Dellert et al. | |
| 6,154,771 A | 11/2000 | Rangan et al. | |
| 6,181,342 B1 | 1/2001 | Niblack | |
| 6,182,072 B1 | 1/2001 | Leak et al. | |
| 6,182,097 B1 | 1/2001 | Hansen et al. | |
| 6,184,886 B1 | 2/2001 | Bates et al. | |
| 6,199,081 B1 | 3/2001 | Meyerzon et al. | |
| 6,230,321 B1 | 5/2001 | Kim | |
| 6,237,006 B1 | 5/2001 | Weinberg et al. | |
| 6,252,588 B1 | 6/2001 | Dawson | |
| 6,259,819 B1 | 7/2001 | Andrew et al. | |
| 6,262,708 B1 | 7/2001 | Chu | |
| 6,269,357 B1 | 7/2001 | Nakayama et al. | |
| 6,269,370 B1 | 7/2001 | Kirsch | |
| 6,271,840 B1 | 8/2001 | Finseth et al. | |
| 6,272,484 B1 | 8/2001 | Martin et al. | |
| 6,273,857 B1 | 8/2001 | Aden | |
| 6,275,829 B1 | 8/2001 | Angiulo et al. | |
| 6,282,548 B1 | 8/2001 | Burner et al. | |
| 6,286,084 B1 * | 9/2001 | Wexler et al. | 711/152 |
| 6,300,947 B1 | 10/2001 | Kanevsky | |
| 6,301,607 B2 | 10/2001 | Barraclough et al. | |
| 6,310,601 B1 | 10/2001 | Moore et al. | |
| 6,321,231 B1 | 11/2001 | Jebens et al. | |
| 6,349,330 B1 | 2/2002 | Bernadett et al. | |
| 6,353,448 B1 | 3/2002 | Scarborough et al. | |
| 6,356,908 B1 * | 3/2002 | Brown et al. | 707/10 |
| 6,369,811 B1 | 4/2002 | Graham et al. | |
| 6,374,273 B1 | 4/2002 | Webster | |
| 6,400,378 B1 | 6/2002 | Snook | |
| 6,401,118 B1 | 6/2002 | Thomas | |
| 6,421,070 B1 | 7/2002 | Ramos et al. | |
| 6,426,801 B1 | 7/2002 | Reed | |
| 6,449,639 B1 | 9/2002 | Blumberg | |
| 6,456,307 B1 | 9/2002 | Bates et al. | |
| 6,484,895 B2 | 11/2002 | Montgomery et al. | |
| 6,486,895 B1 | 11/2002 | Robertson et al. | |
| 6,496,206 B1 | 12/2002 | Mernyk et al. | |
| 6,496,849 B1 | 12/2002 | Hanson et al. | |
| 6,505,964 B1 | 1/2003 | Ando et al. | |
| 6,510,461 B1 | 1/2003 | Nielsen | |
| 6,526,424 B2 | 2/2003 | Kanno et al. | |
| 6,539,424 B1 * | 3/2003 | Dutta | 709/219 |
| 6,545,687 B2 | 4/2003 | Scott et al. | |
| 6,578,078 B1 | 6/2003 | Smith et al. | |
| 6,584,498 B2 | 6/2003 | Nguyen | |
| 6,594,697 B1 | 7/2003 | Praitis et al. | |
| 6,613,100 B2 | 9/2003 | Miller | |
| 6,665,838 B1 | 12/2003 | Brown et al. | |
| 6,714,209 B2 | 3/2004 | Van Valer | |
| 6,732,086 B2 | 5/2004 | Plow et al. | |
| 6,734,876 B2 | 5/2004 | Niikawa et al. | |
| 6,760,128 B2 | 7/2004 | Jackson et al. | |
| 6,781,629 B2 | 8/2004 | Ohnogi | |
| 6,812,962 B1 | 11/2004 | Fredlund et al. | |
| 6,816,283 B1 | 11/2004 | Yamamoto et al. | |
| 6,864,904 B1 | 3/2005 | Ran et al. | |
| 6,868,189 B1 | 3/2005 | Hoshino | |
| 6,871,009 B1 | 3/2005 | Suzuki | |
| 7,032,171 B1 | 4/2006 | Carroll | |
| 7,073,121 B2 | 7/2006 | Brown et al. | |
| 7,162,493 B2 | 1/2007 | Weiss et al. | |
| 7,174,513 B1 | 2/2007 | Nickum | |
| 7,177,948 B1 | 2/2007 | Kraft et al. | |
| 2006/0149721 A1 | 7/2006 | Langford | |

FOREIGN PATENT DOCUMENTS

| | | |
|---|---|---|
| EP | 0 961 212 | 12/1999 |
| JP | 2001-134516 | 5/1989 |
| JP | 2001-290825 | 11/1989 |
| JP | 2000-112856 | 4/2000 |

OTHER PUBLICATIONS

A. Cockburn, et al., "WebView: A Graphical Aid for Revisiting Web Pages", Proc. of the OZCHI'99 Australian Conference on Human Computer Interaction, Nov. 28-30, 1999.

S. Kaasten, et al., "Designing an Integrated Bookmark/History System for Web Browsing", Proc. of the Western Computer Graphics Symp. Mar. 26-29, 2000.

Ditto.com—The Visual Search Engine That Lets Users See The Web; Next-Generation Search Engine Goes Beyond Words To Deliver Unique Web Content Text Engines Miss—Product Announcement, Edge: Work Group Computing Report, Aug. 1999.

Image and Video Searching—www.ditto.com, www.broadcast.com—Company Business and Marketing—Brief Article: Home Office Computing, Curtco Freedom Communications. Nov. 1999.

Dialog English Abstracts of JP 2001-290825 dated Oct. 19, 2001.

Dialog English Abstracts of JP 2001-134516 dated May 18, 2001.

Dialog English Abstracts of JP 2000-112856 dated Apr. 21, 2000.

Wynblatt M, et al., "Web page caricatures: multimedia summaries for WWW documents", Multimedia Computing and Systems, 1998. Proceedings IEEE International Conference on Austin, TX, USA, Jun. 28-Jul. 1, 1998.

Brunk B D: "Overview and preview tools for navigating the world-wide web", SILS Technical Report, Jul. 1999, pp. 1-34.

Heydon A, et al., "Mercator: A scalable, extensible web crawler", World Wide Web, vol. 2, No. 4, Dec. 1999, pp. 219-229.

Charles Frankel, et al., "WebSeer: An Image Search Engine for the World Wide Web", Technical Report 96-14, Aug. 1, 1996.

"Site-Seer: *The DOJ v. Microsoft*", From CNN Interactive Writer David Mandeville, Mar. 2, 1998.

Knefel; Baseball Web Site All-Stars; cnn.hu; Mar. 20, 1998.

TRCWeb Direct — Client Portfolio; www.webarchive.org; 1998.

Meyer, et al., Borealis Redux: The Evolution of An Image Server; 1996; http://meyerweb.com; Case Western Reserve University; Cleveland, Ohio.

Meyer, et al., Borealis Image Server; 1996; http://meyerweb.com; Case Western Reserve University; Cleveland, Ohio.

Meyer, et al., Borealis Image Server; 1996; pp. 1123-1137; Computer Networks and ISDN Systems; vol. 28; Case Western Reserve University; Cleveland University.

Schmid; Web Representation with Dynamic Thumbnails; Department of Distributed Systems; University of Ulm; Germany (4 pages) Mar. 1998.

Schmid; Web Representation with Dynamic Thumbnails; Department of Distributed Systems; Computer Science Faculty; University of Ulm; Germany (17 pages) Mar. 1998.

Grobe; An Instantaneous Introduction to CGI Scripts and HTML Forms; Jun. 1998; http://condor.cc.ku.edu.

Entertainment and the Media Search; Apr. 14, 2008; www.jumpcity.com.
Cohen, A; "Top of the Net", Magazine; Jan. 2002. http://webarchive.org; YAHOO Internet Life Magazine; Jan. 2002.
Robinson, et al., The Common Gateway Interface (CGI) Version 1.1; Oct. 2004; the Apache Software Foundation.
Blackburn, N., "Girafa.com Gets the Picture"; Sep. 9, 2004; Israel Venture Capital Weekly Newsletter; Apr. 2, 2008, Jerusalem Post.
Answering Brief of Defendants Amazon Web Services LLC, Amazon.com, inc., and Alexa Internet Inc. in Opposition to Girafa.com Inc.'s Motion for Preliminary Injunction (Redacted), May 22, 2008 (Author Unknown).
Snap Technologies, Inc.'s Memorandum of Law in Opposition to Girafa.com's Motion for Preliminary Injunction (May 16, 2008), (Author Unknown).
Declaration of Mark Nielsen with Exhibits (EXH. J Redacted), May 16, 2008.
Case Summon for District Court Case # 07-787-SLR.
ditto.com — The Visual Search Engine That Lets Users See the Web; Next-Generation Search Engine Goes Beyond Words to Deliver Unique Web Content Text Engines Miss - Product Announcement; Edge: Work-Group Computing Report; Aug. 9, 1999; Edge Publishing.
Image and Video Searching - www.ditto.com, www.broadcast.com - Company Business and Marketing - Brief Article; Home Office Computing; Nov. 1999; Curtco Freedom Communications.
Eric Z. Ayers, et al., "Using graphic history in browsing the world wide web", Technical Report GIT-GVU-95-12, May 1995.
Czerwinski, et al., "The contribution of thumbnail image, mouseover text and spatial location memory to web page retrieval in 3D", 1999.
Web Snapshot Highlights MediaPaq's Enhanced Multimedia Object Management Software in Beta at http://www.mediapaq.com. Aug. 12, 1996.
Jonathan I. Helfinan, "Mandala: An Architecture for Using Images to Access and Organize Web Information", www.fly2.ws/mandala.
Declaration of Joseph Hardin with Exhibits, May 16, 2008.
Declaration of Gabriel Robins with Exhibits, May 14, 2008.
Michael Wynblatt, D. Benson: Siemens Corporate Research, Princeton New Jersey; *Web Page Caricatures: Multimedia Summaries for WWW Documents*.
S. Kaasten, S. Greenberg: Proceedings of th Western Computer Graphics Symposium 2000, Mar. 26-29, 2000: *Designing an Integrated Bookmark/History System for Web Browsing*.
A. Cockburn, S. Greenberg, B. McKenzie, M. Jasonsmith, S. Kaasten: *Webview: A graphical Aid for Revisiting Web Pages:* Proceedings of OZCH1'99 Australian Conference Nov. 28-30 1999.
E. Meyer, P. Murray: Exhibit J.: *Borealis Image Server:* Computer Networks and ISDN Systems 28 (1996) 1123-1137.
Exhibit AL: Entertainment and the Media Jumpcity.com.
A. Cockburn, S. Greenberg: Issues of Page Representation and Organisation in Web Browser's Revisitation Tools: May 2000, 120-127.
A. Cohen: Top of the New 2001: Aug. 10, 2002.
Kopetzky, M. Muhlhauser: *Visual preview for link traversal on the world wideweb:* Computer Networks 1999: 1525-1532.
Griafa. Com, INc. DA No. 07-787 (SLR): *Smap Technologies, Inc.'s Memorandum of Law in Opposition to Girafa.Com's Motion for Preliminary Injuction*.
Plaintiff Girafa.com, Inc.'s Motion for Preliminary Injunction with Exhibits A to M.
Plaintiff Girafa.com, Inc.'s Opening Memorandum of Law in Support of its Motion for Preliminary Injunction with Exhibits 1 to 14.
Plaintiff Girafa.Com, Inc.'s Reply Brief in Support of its Motion for Preliminary Injunction (with Exhibits 1-14).
Declaration of Dr. Brad A. Myers.
Declaration of Shirli Ran In Support of Plaintiff Girafa.Com, Inc.'s Motion for Preliminary Injunction (with Exhibits 1-6).
Memorandum Opinion of Judge Sue L. Robinson, U.S.District Judge for the District of Delaware, of Sep. 15, 2009.
Declaration of Dr. Brad A. Myers in Support of Girafa'S Oppositions to Defendants' Summary Judgement Motions (vols. I-111) With Exhibits.
Transcript of Videotaped Deposition of Brad A. Myers, Ph.D. conducted on Apr. 20, 2000 with exibits.
Declaration of Kristian Lemmerman with Exhibit A.
Declaration of Stefan Schmid With Exhibit A.
Non-Confidential Declaration of Saul Greenberg, Ph.D., in Support of Defendants' Motions for Summary Judgement.
Expert Report of Joseph Harding With Exhibits A-Z and AA-AL.
Defendants' Answering Claim Construction Brief (Redacted Public Version).
Defendants' Claim Construction Brief (Redacted Public Version).
Supplemental Expert Report of Dr. Brad A. Myers.
Volumes of I-III of Joint Appendix for Parties' Markman Briefs, With Exhibits.
Non-Confidential Declaration of Jennifer A. Kash in Support of Defindants' Motions for Summary Judgement With Exhibits A-Z and AA-KK.
Expert Report of Saul Greenberg, Ph.D., of Feb. 13, 2009 and Exhibits to Expert Report of Saul Greenberg of Feb. 13, 2009.
Transcript of Proceeding Before Honorable Sue L. Robinson, U.S. District Court Judge in the U.S. District Court, District of Delaware, on Aug. 7, 2009.
Plaintiff Girafa.Com, M C .'S Opening Markman Brief.
Plaintiff Girafa Com, Inc.'s Response to Defendants' Claim Construction Brief.
Memorandum Order of Honorable Sue L. Robinson, U.S. District Court Judge, of Sep. 15, 2009.
Memorandum Order of Honorable Sue L. Robinson, U.S. District Court Judge, of Sep. 25, 2009.
Joint Claims Construction Chart for the Disputed Claim Terms of U.S. Appl. No. 6,864,904.
Declaration of Shirli Ran in Support of Plaintiff Girafa.Com, Inc'S Motion for Preliminary Judgement.
Rebuttal Expert Report of Dr. Brad A. Myers on Validity.
Supplemental Expert Report of Dr. Brad A. Myers.
Second Supplemental Expert Report of Dr. Brad A. Myers.
Defendants Amazon Com., Inc. Amazon Web Services LLC and Alexa Internet Inc.'s Supplemental Response to Girafa.Com., Inc.'s First Set of Interrgatories.
Defendants Amazon Com., MC., Amazon Web Services LLC and Alexa Internet Inc.'s Second Supplemental Response to Girafa.Com., MC., First Set of Mterrgatories.
Defendant Snap Technologies, Inc.'s Responses to Plaintiff Girafa Com., Inc.'s First Set of Interragtories.
Plaintiff Girafa.Com., Inc.'s Opposition to Defendants Motion for Partial Summary Judgement of Invalidity Under 35 USC 112, Paragraph 2 of Claims 1,4,7,12-15,18,21-24,29-31,42,44,53&55.
Plaintiff Girafa.Com., Inc.'s Answering Brief in Opposition to Defendants' Motion for Summary Judgement of Invalidity Under 35 USC 103.
Defendants' Reply Brief in Support of Defendants' Motion for Summary Judgement of Invalidity Under 35 USC 103.
Plaintiff, Girafa Com., Inc.'s Opposition to Defendants' Motion for Partial Summary Judgement by Invalikity Under 35 USC 112.
Memorandum in Support of Defendants' Motion for Partial Summary Judgement of Invalidity Under 35 USC 112, Paragraph 2 of Claims.
Defendants IAC Search & Media, Inc. Snap Technoligies, Inc., Yahoo, Inc. Exalead, MC. & Exalead S.A.'S Opening Brief in Support of Their Motion for Summary Judgement of Invalidity Under 35 USC 103.
Defendants' Reply Brief in Support of Their Motion for Partial Summary Judgement of Invalidity Under 35 USC 112, Paragraph 2 of Claims.
Appendix of Exhibits to Defendants Motion for Partial Summary Judgement of Invalidity Under 35 USC 112, Paragraph 2 of Claims.
Defendant Snap Technologies, Inc.'s Second Supplemental Responses to Plaintiff Girafa. Com., Inc.'s First Set of Interrogatories.
Defendant Snap Technologies, Inc.'s Third Supplemental Responses to Plaintiff Girafa. Com., Inc's Fist Set of Interrogatories.
Claim Charts, Indentified as Attachment A, Provided in Response to Plawtiff's Interrogatory Requesting defendants Basis for Contention of Invalidity of U.S. Appl. No. 6,864,904 in View of Prior Art.

Claim Charts, Identified as Exhibit B, Provided in Response to Plaintiff's Interrogatory Requesting Defendants Basis for Contention of Invalidity of U.S. Appl. No. 6,864,904 in View of Prior Art.
Frankel et al., Web Seer: An Image Search Engine for the World Wide Web, Dated Aug. 1,1996.
Site-Seer: *The Doj* v. *Microsoft* Dated Mar. 2, 1998.
CNN-Hey You, Deep Pockets, Do You Know Who Youre Helping, Dated Dec. 19, 1996.
E-Mail From Yuval Yuron to Iliver Hurst-Hiller Dated Jun. 29, 2002.
Lemmer Mar Web Article: Hey You, Deep Pockets, Do You Know Who You're Helping? Dated Dec. 19, 1996.
Double Click: MTRO pp. 1-3 Dated Jun. 25, 1998.
Double Click: Technical Specs, 1 page Dated Feb. 5, 1998.
Double Click Site Modifications, pp. 1-4 Dated Feb. 5, 1998.
Double Click: Delivery pp. 1-3 Dated Feb. 5, 1998.
Japanese Patent App. 2001-134516.
Schmid, Web Representation With Translation of Dynamic Thumbnails Dated Mar. 1998 (Myers Exhibit 35).
Carr et al, Implementing an Open Link Service for the World-Wide Web (Myers Exhibit 42).
Cockburn et al. Webview: A Graphical Aid for Revisiting Web Pages in Proceedmgs of the OZCHI '99 Australian Conference on Human Computer Interacting (Nov. 28-30 Wagga Wagga Australia (Myers Exh.45).
Providence, Arizona Series; Signature.html (Myers Exh 46).
Providence Artistic Hardware and Accessories That Penetrate the Senses, Copyright 1999 (Myers Exhibit 47).
White Paper, The Network Architechture Behind Netaid Copyright 1999 Cisco Systems, Inc.(Myers Exhibit 49).

* cited by examiner

FRAMEWORK FOR PROVIDING VISUAL CONTEXT TO WWW HYPERLINKS

This is a continuation of application Ser. No. 09/708,191 filed on Nov. 8, 2000 now U.S. Pat. No. 6,864,904. The nonprovisional application namely application Ser. No. 09/708,191 filed Nov. 8, 2000, claims the benefit of U.S. Provisional Application No. 60/169,328 filed Dec. 6, 1999 and incorporates the same by reference.

FIELD OF THE INVENTION

The present invention relates to Internet methodologies and systems generally and more particularly to systems and methodologies for displaying information received over the Internet.

BACKGROUND OF THE INVENTION

The following U.S. patents are believed to represent the current state of the art: U.S. Pat. Nos. 6,101,510; 6,016,494; 6,011,537; 5,973,692.

The following disclosures are also believed to be relevant to the subject matter of the present invention:

R. J. Yarger, G. Reese, and T. King "MySQL & mSQL," O'REILLY & Associates Inc, 1999, ISBN 1-56592-434-7;

B. Laurie, and P. Laurie "Apache the Definitive Guide, 2nd edition," O'REILLY & Associates Inc, 1999, ISBN 1-56592-528-9;

C. Musciano, and B. Kennedy "HTML the Definitive Guide, 3rd edition," O'REILLY & Associates Inc, 1998, ISBN 1-56592-492-4;

Libwww http://www.w3.org/Library;

T. Berners-Lee, R. Fielding, and L. Masinter "Uniform Resource Identifiers (URI): Generic Syntax", RFC 2396, August 1998.

SUMMARY OF THE INVENTION

The present invention seeks to provide a particularly beneficial methodology and system for displaying information received over the Internet.

There is thus provided in accordance with a preferred embodiment of the present invention a method for presenting Internet information to a user. The method includes providing to a user a visual image of a web page containing at least one hyperlink, and at least partially concurrently providing a visual image of another web page of at least one web site which is represented by said at least one hyperlink.

Further in accordance with a preferred embodiment of the present invention the visual image of said another web page is displayed alongside the visual image of said web page.

Preferably the visual image of another web page appears hovering over said hyperlink.

Still further in accordance with a preferred embodiment of the present invention the visual image of said another web page is displayed within the visual image of said web page. The visual image of another web page appears hovering over said hyperlink.

Additionally in accordance with a preferred embodiment of the present invention the visual images of a plurality of other web pages represented by at least one hyperlink are displayed simultaneously along with said visual image of a web page containing at least one hyperlink.

Furthermore in accordance with a preferred embodiment of the present invention the web page comprises an HTML page.

Moreover in accordance with a preferred embodiment of the present invention, the method also includes providing a visual image of another web page includes employing a web browser including visualization functionality which interfaces via the Internet with an image server.

Preferably the visualization functionality is operative to download via the image server from an image database images of web pages which are referenced in hyperlinks contained in the web page and to provide to a user, via the web browser, an annotated web page.

Additionally or alternatively the annotated web page includes the web page having alongside it images of homepages linked with the web page.

Further in accordance with a preferred embodiment of the present invention, the method includes providing a visual image of another web page and includes employing a web browser which interfaces via the Internet with a web server including visualization functionality.

Preferably the visualization functionality operates to embed commands to the web browser to download, via an image server, images of web pages which are referenced in hyperlinks contained in the web page and to provide to a user, via the web browser, an annotated web page.

Additionally the annotated web page may include the web page having within it images of homepages linked with the web page.

Additionally in accordance with a preferred embodiment of the present invention the visualization functionality includes generation of a list of hyperlinks from a web page, elimination of links which refer back to a web server sending said web page, determination of whether redirection links are present and if so, visualizing an ultimate destination thereof and visualizing remaining hyperlinks.

Further in accordance with a preferred embodiment of the present invention the visualization functionality may also include receiving a list of hyperlinks, splitting a URL of each hyperlink into URL components including at least a path component and a host component, trimming a path component based on the consideration of finding the most representative image of a given web page and constructing a new URL including a trimmed path component.

There is also thus provided in accordance with a preferred embodiment of the present invention a method for generating a web page image database. The method includes receiving a list of URLs corresponding to web pages, the images of which it is desired to download into an image database, operating a multiplicity of downloaders simultaneously by supplying to each downloader one URL at a time, causing each downloader to retrieve from the Internet, a web page and embedded objects corresponding to the URL supplied to it, causing a thumbnail generator to render the web page and causing said thumbnail generator to shrink said rendered image of the web page and supply it to the downloader.

Further in accordance with a preferred embodiment of the present invention the method also includes deleting executable content from the web page.

Still further in accordance with a preferred embodiment of the present invention the method includes causing each downloader to retrieve from the Internet, a web page and embedded objects corresponding to the URL supplied to it and causing a thumbnail generator to operate a corresponding web browser to render the web page employ a locally stored copy of said web page and said embedded objects.

Additionally in accordance with a preferred embodiment of the present invention the method includes employing a web server for providing said locally stored copy of said web page and of said embedded objects to said web browser.

Furthermore in accordance with a preferred embodiment of the present invention the visual image of another web page appears hovering over said hyperlink.

There is further provided in accordance with another preferred embodiment of the present invention a system for presenting Internet information to a user including a first functionality providing to a user a visual image of a web page containing at least one hyperlink and a second functionality operative at least partially concurrently with said first functionality for providing a visual image of another web page of at least one web site which is represented by said at least one hyperlink.

Further in accordance with a preferred embodiment of the present invention the visual image of said another web page is displayed alongside the visual image of said web page.

Still further in accordance with a preferred embodiment of the present invention the visual image of said another web page is displayed within the visual image of said web page.

Furthermore in accordance with a preferred embodiment of the present invention the visual images of a plurality of other web pages represented by at least one hyperlink are displayed simultaneously along with said visual image of a web page containing at least one hyperlink.

Additionally in accordance with a preferred embodiment of the present invention the web page comprises an HTML page.

Further in accordance with a preferred embodiment of the present invention the second functionality comprises third functionality employing a web browser including visualization functionality which interfaces via the Internet with an image server.

Preferably the visualization functionality is operative to download via the image server from an image database images of web pages which are referenced in hyperlinks contained in the web page and to provide to a user, via the web browser, an annotated web page. Additionally or alternatively the annotated web page includes the web page having alongside it images of homepages linked with the web page.

Further in accordance with a preferred embodiment of the present invention the second functionality comprises fourth functionality employing a web browser which interfaces via the Internet with a web server including visualization functionality.

Preferably the visualization functionality is operative to embed commands to the web browser to download, via an image server, images of web pages which are referenced in hyperlinks contained in the web page and to provide to a user, via the web browser, an annotated web page. Additionally or alternatively the annotated web page includes the web page having within it images of homepages linked with the web page.

Further in accordance with a preferred embodiment of the present invention the visualization functionality includes the generation of a list of hyperlinks from a web page, the elimination of links which refer back to a web server sending said web page, the determination of whether redirection links are present and if so, visualizing an ultimate destination thereof and the visualizing remaining hyperlinks.

Still further in accordance with a preferred embodiment of the present invention the visualization functionality includes receiving a list of hyperlinks, splitting a URL of each hyperlink into URL components including at least a path component and a host component, trimming a path component based on the consideration of finding the most representative image of a given web page and constructing a new URL including a trimmed path component.

Furthermore in accordance with a preferred embodiment of the present invention the visual image of another web page appears hovering over said hyperlink.

Additionally in accordance with a preferred embodiment of the present invention the visual image of another web page appears hovering over said hyperlink.

Additionally or alternatively the visual image of another web page appears hovering over said hyperlink. Preferably the visual image of another web page appears hovering over said hyperlink.

Furthermore the visual image of another web page may appear to hover over said hyperlink.

Still further in accordance with a preferred embodiment of the present invention the visual image of another web page appears hovering over said hyperlink.

There is provided in accordance with yet another preferred embodiment of the present invention a system for generating a web page image database, the system includes at least one downloader receiving one URL at a time and retrieving from the Internet a web page and embedded objects corresponding to the URL received by it and at least one thumbnail generator operative to render the web page, shrink said rendered image of the web page and supply said rendered image to the downloader.

Further in accordance with a preferred embodiment of the present invention the at least one downloader is operative to delete executable content from the web page.

Still further in accordance with a preferred embodiment of the present invention each downloader retrieves from the Internet, a web page and embedded objects corresponding to the URL received by it and locally stores a copy of said web page and said embedded objects and causes said thumbnail generator to render the web page by employing said locally stored copy of said web page and said embedded objects.

Preferably the system also includes a web server providing said locally stored copy of said web page and of said embedded objects.

BRIEF DESCRIPTION OF THE DRAWINGS

The present invention will be understood and appreciated more fully from the following detailed description, taken in conjunction with the drawings in which.

LIST OF APPENDICES

Appendix A is a software listing in hexadecimal form of software suitable for providing the visualization functionality of FIG. 1 when installed in accordance with installation instructions set forth hereinbelow;

Appendix B is a software listing in hexadecimal form of software suitable for providing the functionality of FIG. 6 when installed in accordance with installation instructions set forth hereinbelow;

Appendix C is a software listing in hexadecimal form of software suitable for providing the functionality of an image server of FIG. 1 and FIG. 2 when installed in accordance with installation instructions set forth hereinbelow.

The foregoing software listing are protected by copyright in the USA and in all other jurisdictions.

Appendix A, Appendix B and Appendix C are included on Copy 1 and Copy 2 of the CD-Rs attached herewith to the present application. Each CD-R includes the files GIRAFA-.hex (Appendix A) of Nov. 7, 2000 and of length 3,052,711 bytes; ARANHA.hex (Appendix B) of Nov. 7, 2000 and of length 5,498,984 bytes and IMAGE.hex (Appendix C) of Nov. 7, 2000 and of length 217,154 bytes.

DETAILED DESCRIPTION OF PREFERRED EMBODIMENTS

Figure 1:
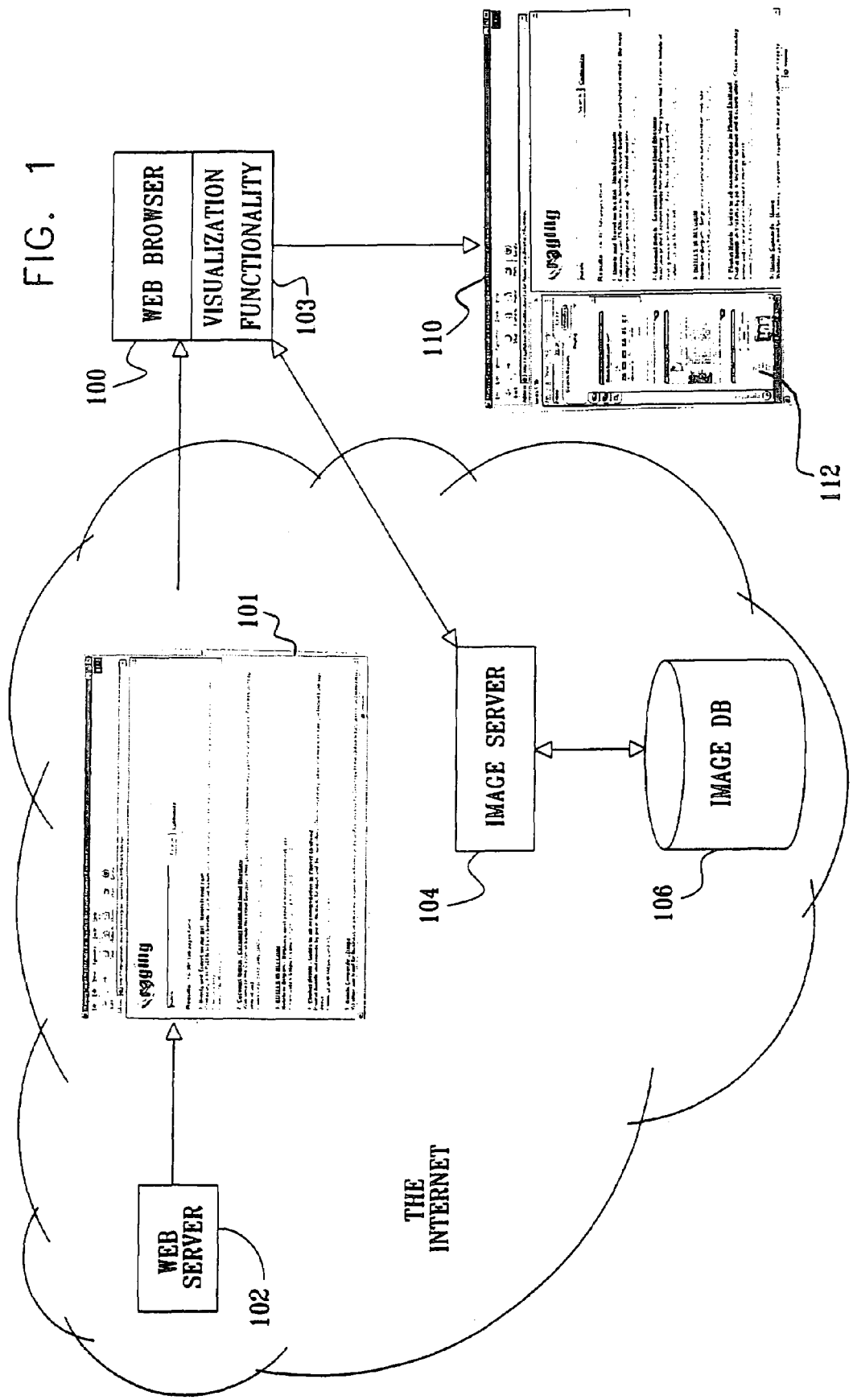
FIG. 1 is a simplified partially pictorial, partially block diagram illustration of a system and methodology for displaying information received over the Internet in accordance with a preferred embodiment of the present invention.

Reference is now made to FIG. 1, which is a simplified partially pictorial, partially block diagram illustration of a system and methodology for displaying information received over the Internet in accordance with a preferred embodiment of the present invention. As seen in FIG. 1, a web browser 100, such as Microsoft Internet Explorer 5.5, typically resident on a PC, such as a Dell Dimension L733 running Microsoft Windows 98, receives a web page 101, such as an HTML page, over the Internet from a web server 102. The web browser 100 preferably includes visualization functionality 103 which interfaces, typically via the Internet, with an image server 104, such as a Dell Power Edge 2450 running Apache 1.3.12 on an OpenBSD 2.7 operating system.

The image server 104 interfaces with an image database 106, which is preferably a Dell Power Edge 2450 running MySQL 3.23.25 on an OpenBSD 2.7 operating system which is preferably loaded by using functionality of the type described hereinbelow with reference to FIG. 7.

The visualization functionality 103 is operative to download via the image server 104 from the image database 106 images of web pages which are referenced in hyperlinks contained in the web page 101 and to provide to a user, via the web browser 100, an annotated web page 110, which preferably includes the web page 101 having alongside it images 112 of homepages linked with web page 101.

Figure 2:
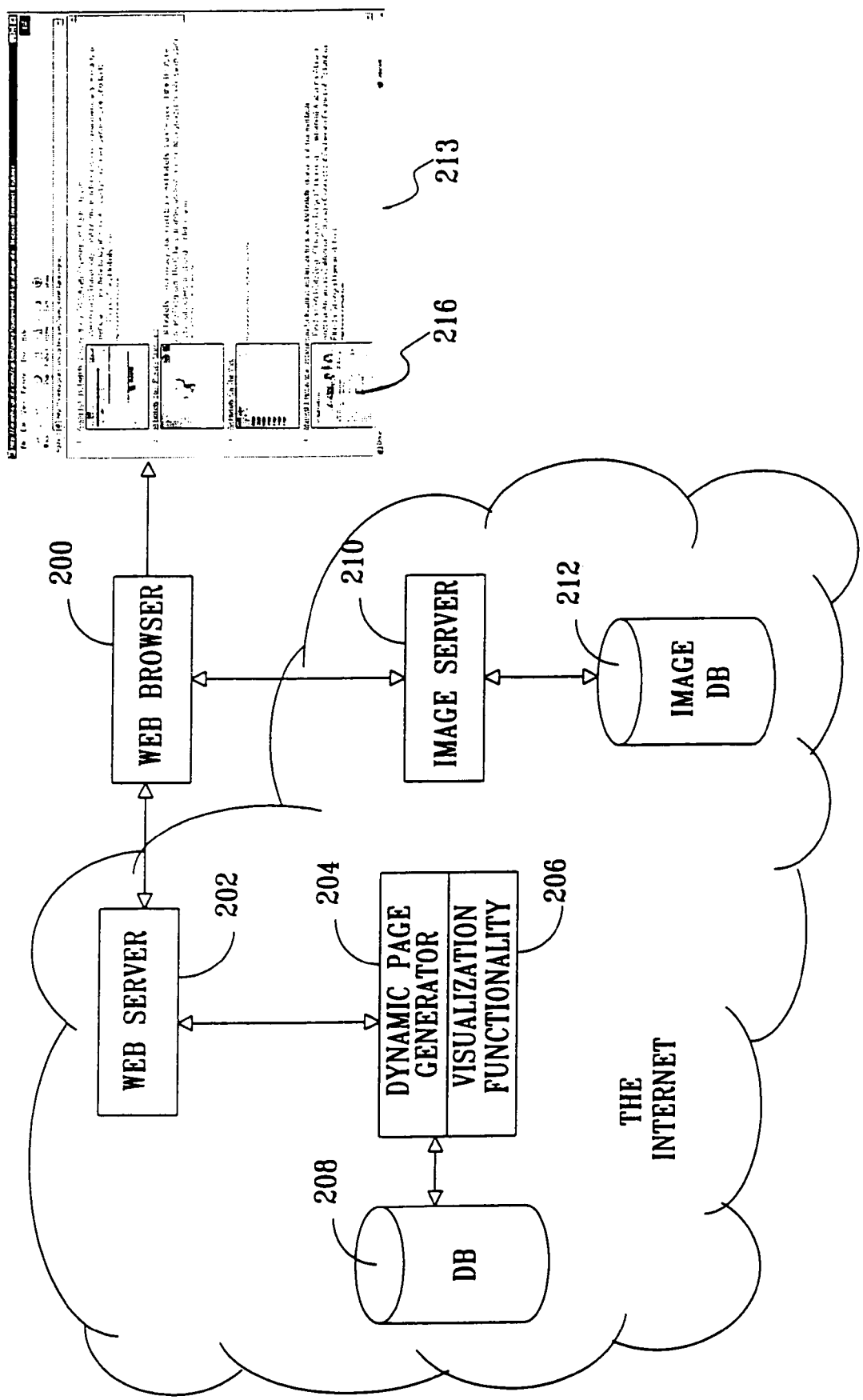
FIG. 2 is a simplified partially pictorial, partially block diagram illustration of a system and methodology for displaying information received over the Internet in accordance with another preferred embodiment of the present invention.

Reference is now made to FIG. 2, which is a simplified partially pictorial, partially block diagram illustration of a system and methodology for displaying information received over the Internet in accordance with another preferred embodiment of the present invention. As seen in FIG. 2, a web browser 200, typically resident on a PC, such as a Dell Dimension L733 running Microsoft Windows 98, interfaces, typically via the Internet, with a web server 202, such as a Dell Power Edge 2450 running Apache 1.3.12 on an OpenBSD 2.7 operating system.

The web server 202 interfaces with a dynamic page generator 204, such as a P.H.P. 4.0.2, in which is preferably installed a visualization functionality 206, which is described hereinbelow in greater detail. The dynamic page generator 204 interfaces with a database 208, such as a Dell Power Edge 2450 running MySQL 3.23.25 on an OpenBSD 2.7 operating system.

The web browser 200 preferably interfaces with an image server 210, such as a Dell Power Edge 2450 running Apache 1.3.12 on an OpenBSD 2.7 operating system. The image server 210 interfaces with an image database 212, which is preferably a Dell Power Edge 2450 running MySQL 3.23.25 on an OpenBSD 2.7 operating system, which is preferably loaded by using functionality of the type described hereinbelow with reference to FIG. 7.

The visualization functionality 206 is operative to embed within a dynamically generated web page, such as an HTML page, commands to the web browser 200 to download via the image server 210 from the image database 212 images of web pages which are referenced in hyperlinks contained in a web page 213 and to provide to a user, via the web browser 200, the web page 213 annotated to include therewithin images 216 of homepages linked therewith.

It is appreciated that either or both of the embodiments of FIGS. 1 and 2 may provide images of web pages which are referenced in hyperlinks contained in a web page either alongside or within that web page. It is also appreciated that either or both of the embodiments FIGS. 1 and 2 may provide images of web pages which are referenced in hyperlinks contained in a web page, which images hover either over or alongside the hyperlinks. It is appreciated that the visual image of another web page may function as a hyperlink.

Figure 3:
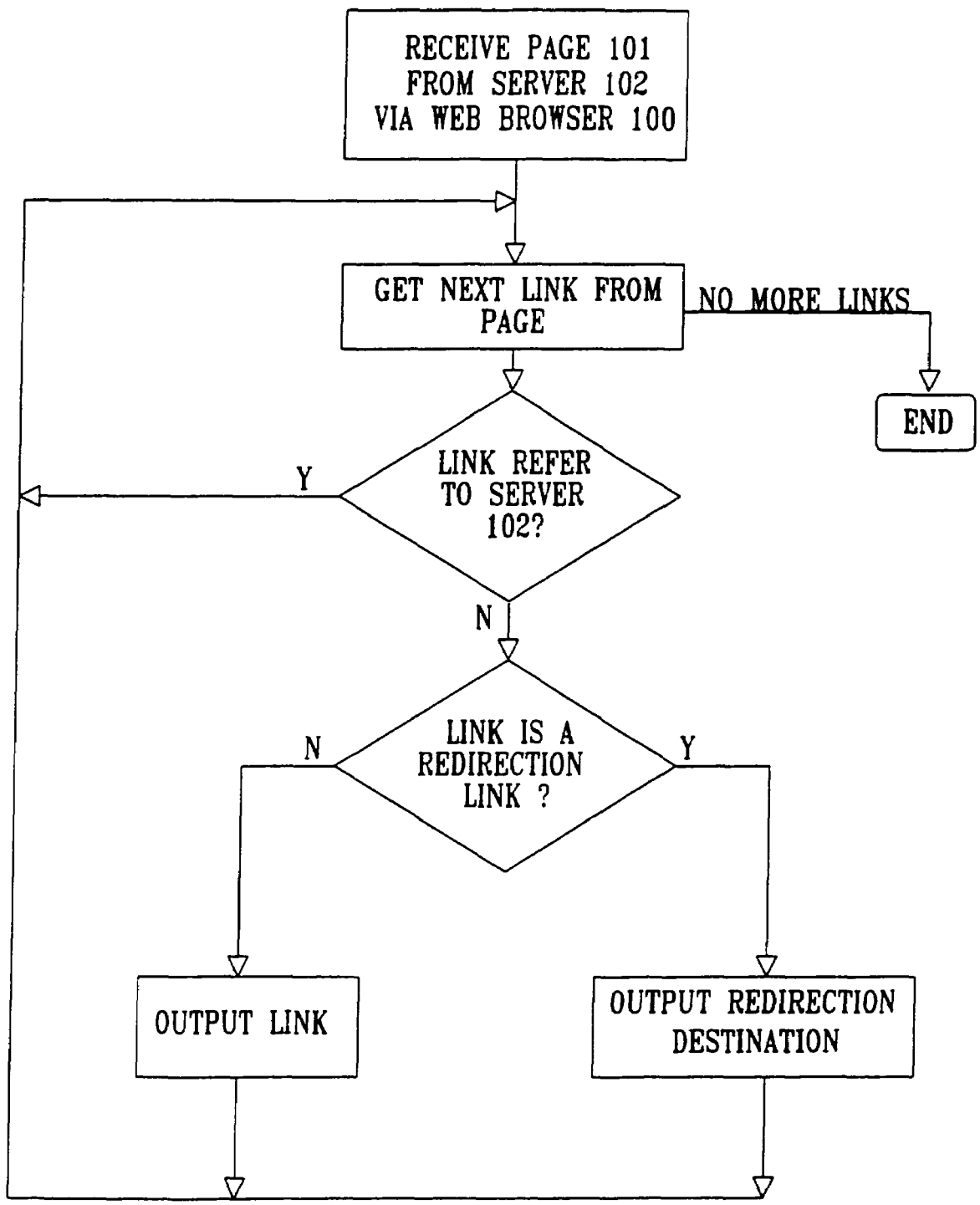
FIG. 3 is a simplified flow chart of part of visualization functionality employed in the system and methodology of FIG. 1.

Reference is now made to FIG. 3, which is a simplified flow chart of part of visualization functionality employed in the system and methodology of FIG. 1. The flow chart of FIG. 3 illustrates generation of a list of hyperlinks from a web page, such as web page 101 in the embodiment of FIG. 1 received from a web server 102.

As each link is extracted from web page 101, an examination is made in order to eliminate links which refer back to web server 102 and to determine whether redirection links are present. This is typically done by searching for the presence of a string "http://" encoded in the URL, which characterizes a redirection link. In the case of links, which appear to be redirection links, only the ultimate destination is listed In the case of links which do not appear to be redirection links, the links themselves are listed. The resulting list is employed as an input to the functionality of FIG. 4.

In the illustrated embodiment of FIG. 3, all of the hyperlinks are processed. Alternatively, not all of the hyperlinks need be processed. In such a case, a user may decide which hyperlinks to process.

Figure 4:
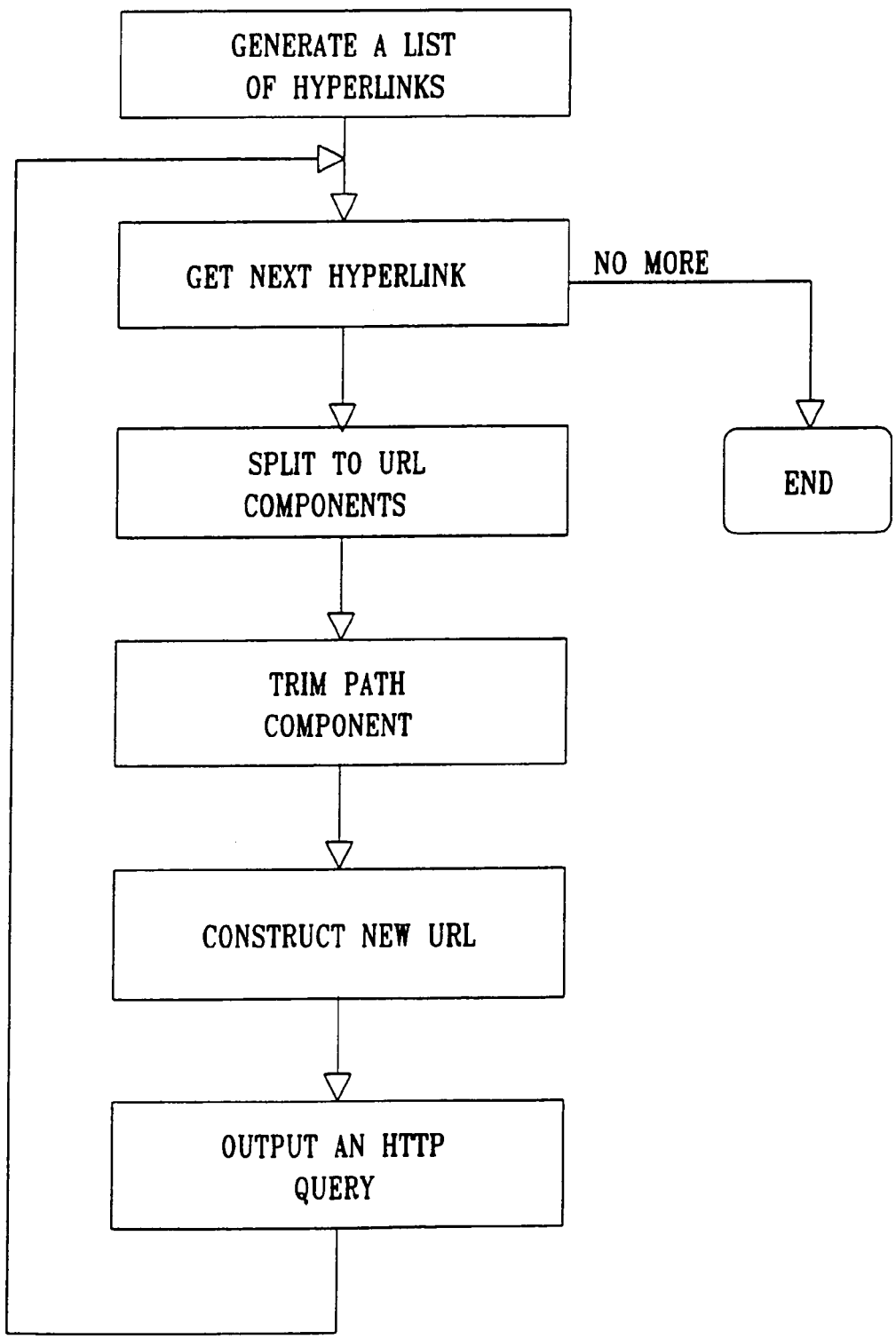
FIG. 4 is a simplified flow chart of visualization functionality employed in accordance with a preferred; embodiment of the present invention.

Reference is now made to FIG. 4, which is a simplified flow chart of visualization functionality employed in accordance with a preferred embodiment of the present invention. As seen in FIG. 4, a list of hyperlinks is received. This list may be derived from a web page such as web page 101 in the embodiment of FIG. 1 using the functionality of FIG. 3 or may be provided by dynamic page generator 204 and obtained via database 208 in the embodiment of FIG. 2.

If hyperlinks are present, the URL of each hyperlink is split into URL components. For example, if the URL of a hyperlink appears as follows: http://www.microsoft.com:80/windows2000/upgrade/compat/search/ computers.asp?page=2&send=1&Order=Sort+by+
Company&CN=Dell&PN=&PT=

The components thereof include the following:
Scheme: http
Host: www.microsoft.com
Port: 80
Path: /windows2000/upgrade/compat/search/computers.asp
Query: page=2&send=1&Order=Sort+by+
Company&CN=Dell&PN=&PT=

The path component may be trimmed based on the consideration of finding the most representative image of a given web page. A flow chart illustrating a preferred algorithm for making this determination appears in FIG. 5 and is described hereinbelow.

Thus, in the above example, the trimmed path component appears as follows:
/windows2000/upgrade Following any trimming of the path component, a new URL is constructed from the scheme, host, port and trimmed path components. This URL is employed for outputting an http query to an image server, such as image server 104 in the embodiment of FIG. 1 or 210 in the embodiment of FIG. 2.

Figure 5:
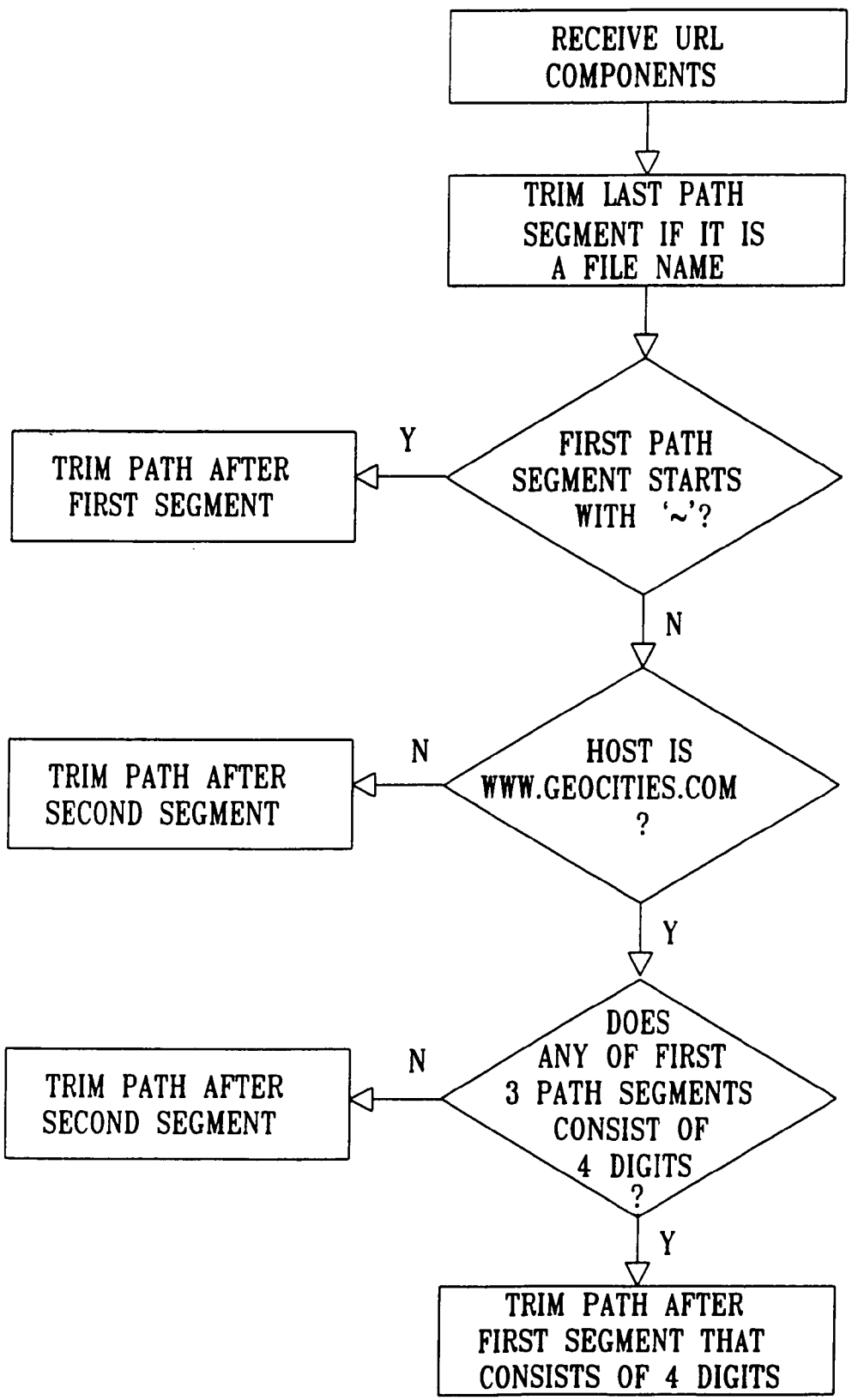
FIG. 5 is a simplified flow chart of path component trimming functionality employed in the embodiment of FIG. 3.

A preferred form of http query in the above example appears as follows:
http://wb1.girafa.com/srv/i?
u=http://
www.microsoft.com%2fwindows2000%2fupgrade Reference is now made to FIG. 5, which is a simplified flow chart of path component trimming functionality employed in the embodiment of FIG. 4. As seen in FIG. 5, the pith component trimming functionality comprises receipt of the URL components after splitting thereof as described hereinabove with reference to the flowchart of FIG. 4. Information from the host component of the URL is employed in trimming of the path component of the URL. Each path component comprises a plurality of path segments.

If the last path segment in a path component is a file name, this path segment is removed. Determination whether a path component is a file name is typically carried out by examining the suffix thereof to determine whether it is a known suffix representing a file name.

If the first path segment starts with a "~", which typically designates a home directory in a Unix system, the path component is trimmed after that first path segment.

If the host is not www.geocities.com, the path component is trimmed after the second path segment.

If the host is www.geocities.com and any of the first three path segments consists of 4 digits, the path component is trimmed after the first segment that consists of 4 digits.

If the host is www.geocities.com and none of the first three path segments consists of 4 digits, the path component is trimmed after the second segment.

Figure 6:
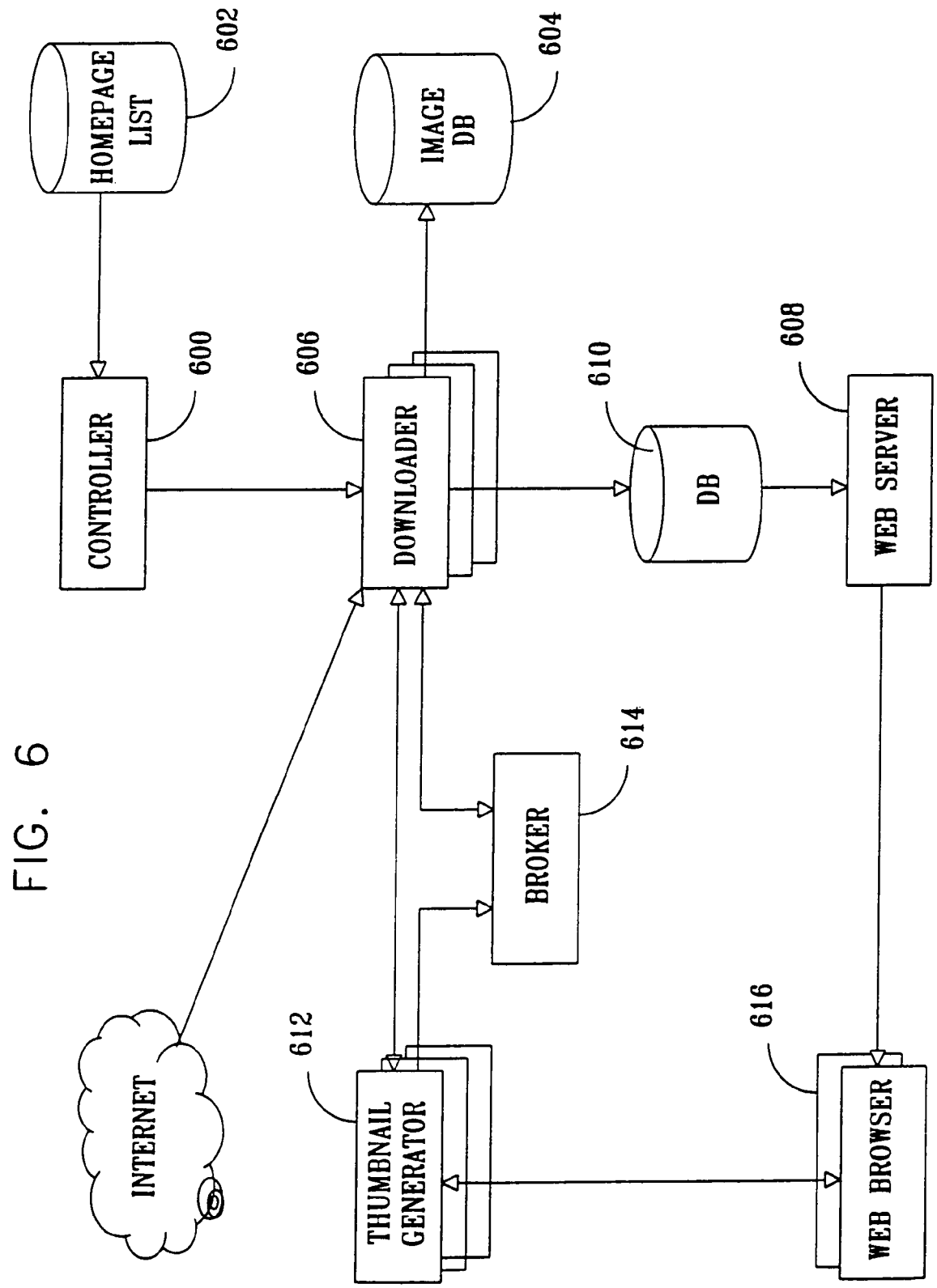
FIG. 6 is a simplified block diagram illustration of a system for generating an image database useful in the system and methodology of FIGS. 1 and 2.

Reference is now made to FIG. 6, which is a simplified block diagram illustration of a system for generating an image database useful in the system and methodology of FIGS. 1 and 2. As seen in FIG. 6, a controller 600 receives a list 602 of homepages, the images of which it is desired to download into an image database 604, such as image database 106 in the embodiment of FIG. 1 or image database 212 in the embodiment of FIG. 2.

The controller 600 operates a multiplicity of downloaders 606 simultaneously by supplying to each downloader one URL at a time. Each downloader 606 retrieves from the Internet, the homepage and the embedded objects corresponding to the URL supplied to it by the controller 600 and deletes therefrom executable block content. The resulting output of the downloaders 606 is supplied to a web server 608 via a database 610.

Each downloader 606 establishes a connection with one of a plurality of thumbnail generators 612 via a broker 614. Once this connection has been established, a URL of a locally stored copy of a downloaded homepage, which is stored in database 610, is sent to the thumbnail generator 612 with which the connection has been established.

Each thumbnail generator 612 operates a corresponding web browser 616 to download via web server 608 the locally stored copy of the homepage, which is stored in database 610. The thumbnail generators 612 each receive a rendered image of the homepage from a corresponding web browser 616 and shrink it and supply it to the downloader 606 with which the connection has been established.

It is appreciated that normally the number of downloaders exceeds the number of thumbnail generators by at least an order of magnitude. The broker 614 coordinates interaction between a thumbnail generator and a downloader.

Figure 7:
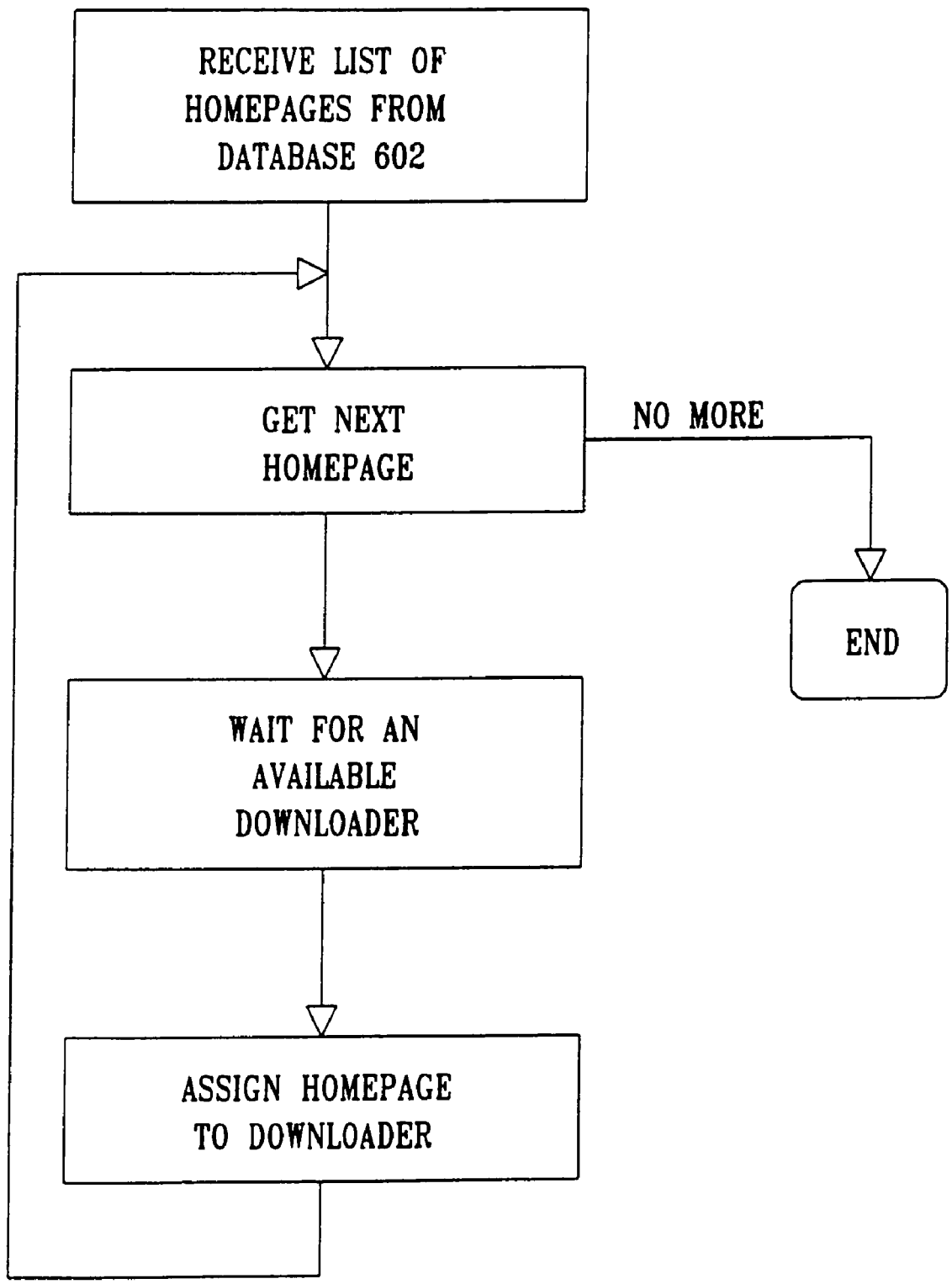
FIG. 7 is a flown chart illustrating operation of a controller forming part of the system of FIG. 6.

Reference is no made to FIG. 7, which is a flow chart illustrating operation of a controller forming part of the system of FIG. 6. A list of homepages is received from database 602 (FIG. 6). Each homepage is taken from the list and downloaded by a downloader 606 (FIG. 6). The functionality of FIG. 7 ensures that a predetermined number of downloaders operate simultaneously, so long as the list of undownloaded homepages is sufficiently long.

Figure 8:
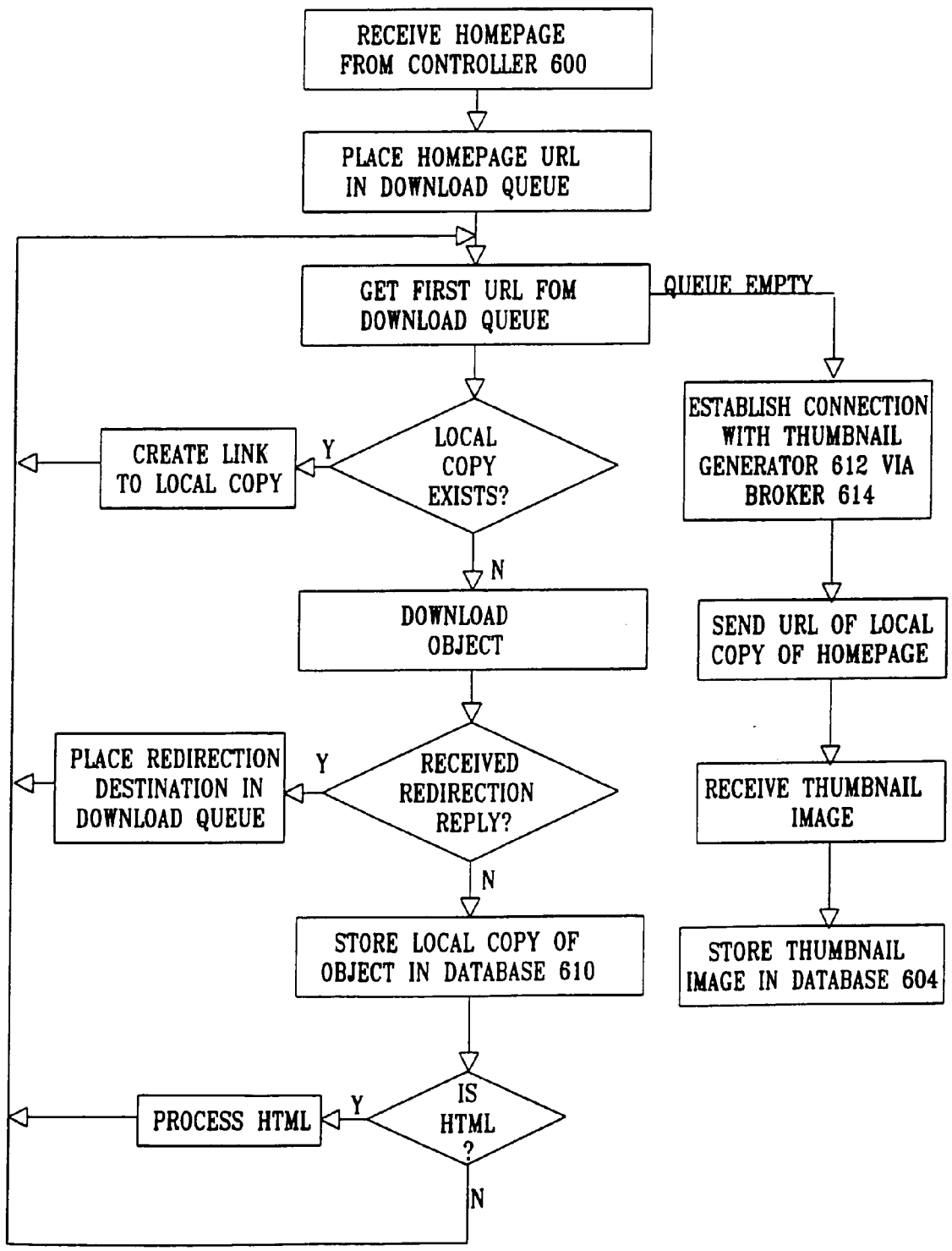
FIG. 8 is a flow chart illustrating operation of a downloader forming part of the system of FIG. 6.

Reference is now made to FIG. 8, which is a flow chart illustrating operation of a downloader forming part of the system of FIG. 6. As seen in FIG. 8, each downloader maintains a download queue for the homepage which the downloader is, currently downloading. The download queue includes a list of URLs of objects in the homepage as well as the homepage object that require downloading in order to provide a local copy of the homepage.

For each URL in the download queue, an inquiry is made whether a local copy of the object corresponding thereto already exists. If so, a link to that local copy is created. If not, an attempt is made to download the object. If upon attempting to download the object, the downloader is informed that the object is located on another URL. i.e. by the receipt of redirection reply, that URL is placed in the download queue.

If, the download is successful, the downloaded object is stored in database 610 (FIG. 6) as a local copy. If the downloaded object is an HTML page, then the HTML page is processed, preferably by an algorithm of the type described hereinbelow in FIG. 9.

When the download queue is empty, a connection is established with thumbnail generator 612 (FIG. 6) via broker 614 (FIG. 6). The URL of the local copy of the homepage object is sent to the thumbnail generator 612 and a thumbnail image of the homepage is generated hereby. This thumbnail image is stored in image database 604 (FIG. 6).

Figure 9:
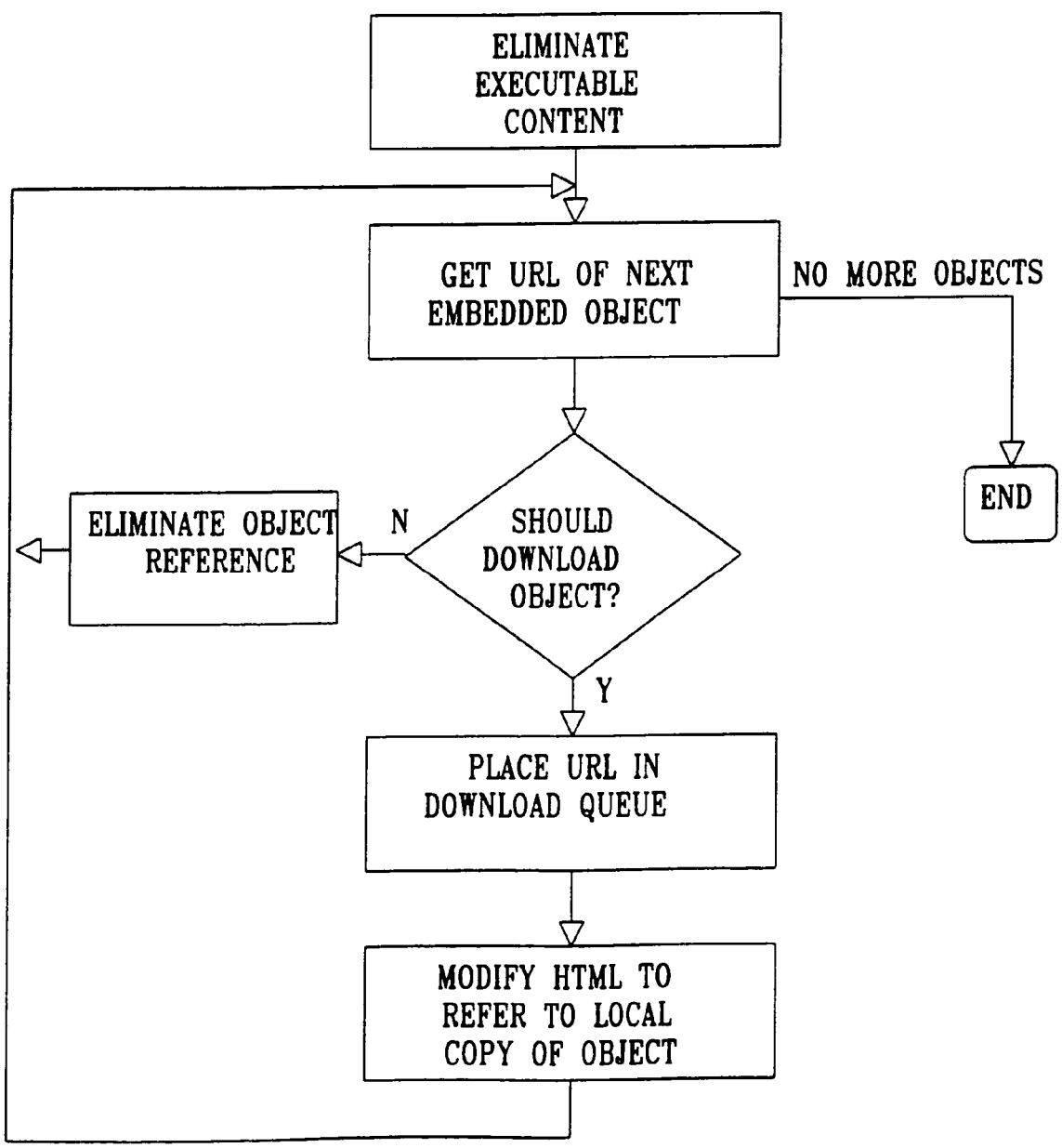
FIG. 9 is a flow chart illustrating operation of a process HTML algorithm employed in the downloader of FIG. 8.

Reference is now made to FIG. 9, which is a flow chart illustrating operation of a process HTML algorithm employed in the downloader of FIG. 8. The HTML object which is downloaded is scanned, the executable content thereof is eliminated and embedded objects therein are recognized.

For each embedded object a decision is made whether to download it. This decision is made based on the nature of the embedded object and the nature of the reference thereto. Generally, images and HTML objects are downloaded.

URLs of objects to be downloaded are placed in the download queue referred to hereinabove in connection with FIG. 8 and the HTML object is modified to refer to the local copies of the objects to be downloaded. References to objects not to be downloaded are eliminated from the HTML object.

Figure 10:
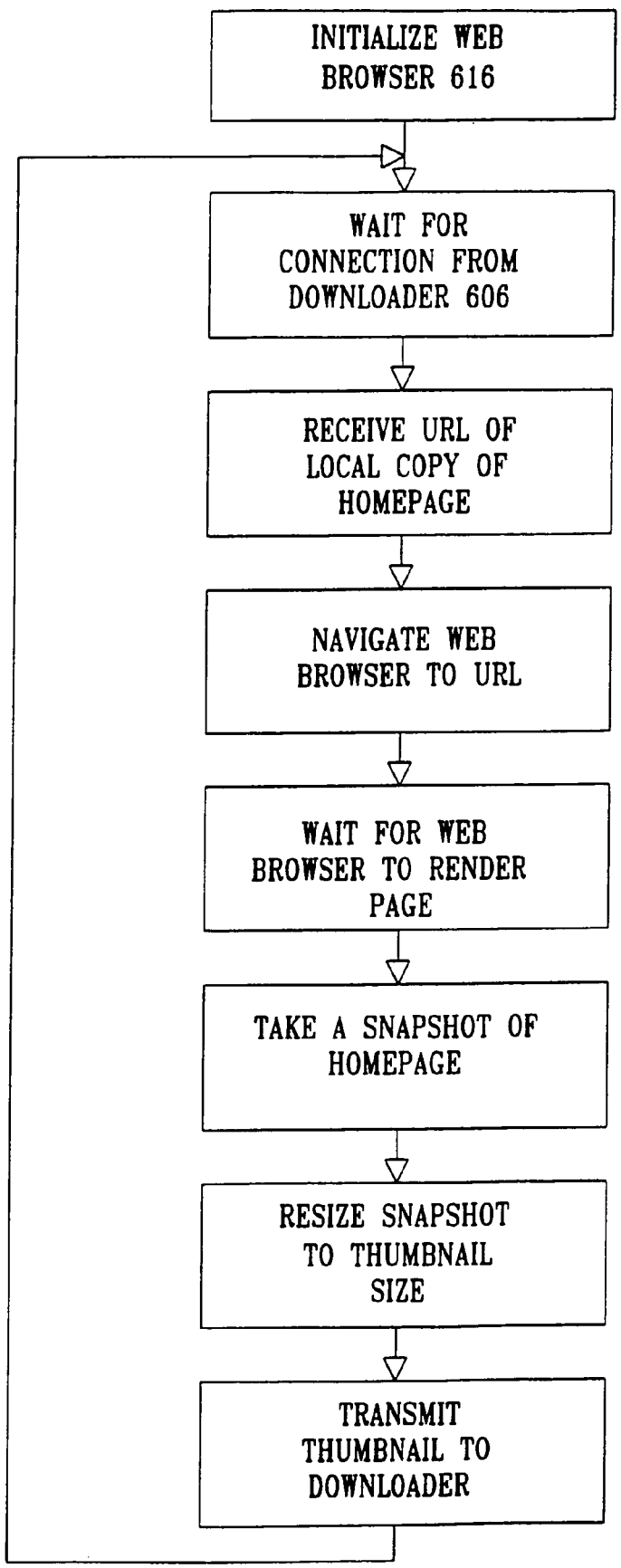
FIG. 10 is a flow chart illustrating operation of a thumbnail generator forming part of the system of FIG. 6.

Reference is now made to FIG. 10, which is a flow chart illustrating operation of a thumbnail generator, such as thumbnail generator 612, forming part of the system of FIG. 6. Initially, the thumbnail generator initializes a web browser functionality 616 (FIG. 6). When a connection is established to the thumbnail generator 612 from a downloader 606 (FIG. 6) via a broker 614 (FIG. 6), the thumbnail generator 612 receives the URL of the local copy of the homepage.

The web browser navigates to that URL and renders the homepage. A snapshot of the homepage is taken, typically in bitmap form. This snapshot is resized to a desired thumbnail size and is then transmitted via the downloader 606 for storage in image database 604.

Figure 11:
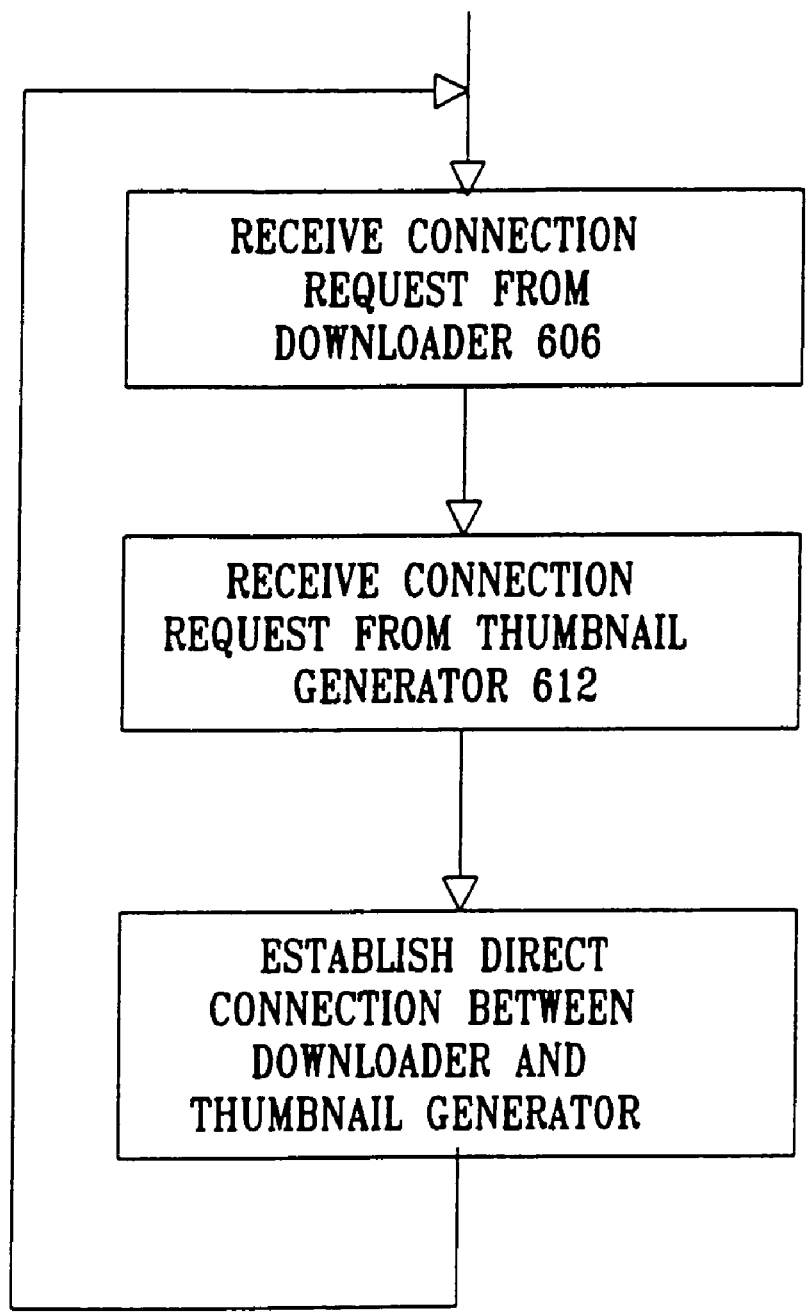
FIG. 11 is a flow chart illustrating operation of a broker forming part of the system of FIG. 6.

Reference is now made to FIG. 11, which is a flow chart illustrating operation of a broker, such as broker 614, forming part of the system of FIG. 6. The broker receives connection requests from both thumbnail generators 612 (FIG. 6) and downloaders 606 (FIG. 6). When simultaneous requests are pending from both a thumbnail generator and a downloader, the broker establishes a direct connection therebetween. When there exists a surplus of connection requests from either thumbnail generators 612 or downloaders 606, queues of such connection requests may be maintained by the broker.

A preferred method for constructing A Framework For Providing Visual Context To WWW Hyperlinks in accordance with a preferred embodiment of the present invention includes the following steps:
1. Generate Binary file GIRAFA.hex from the computer listing of Appendix A.
2. Decode GIRAFA.hex using a MIME compliant decoder, creating Girafa-1-45.exe.

The method for starting the visualization functionality of FIG. 1 with the program in Appendix A includes the following steps:
1. Provide a computer terminal such as an Intel-based Pentium III 800 MHz computer, configured with Microsoft Windows 98 operating system, and Internet Explorer 5.5 Web Browser.
2. Load the file Girafa-1-45.exe to a temporary directory in the computer terminal provided in step 1. Execute the file Girafa-1-45.exe, and follow the installation instructions. When asked to register, press 'cancel'.
3. Edit the file Girafa.ini in the installation directory, replacing every occurrence of the string 'aranha.girafa.com' with the hostname of the image server, and every occurrence of the number 8080 with the number 80.
4. Start the Internet Explorer browser.
5. In the Internet Explorer Window select the View Menu, in it select the Explorer Bars sub-menu, and in it choose GirafaBar.
6. Follow the registration procedure.

A further preferred method for constructing A Framework For Providing Visual Context To WWW Hyperlinks in accordance with a preferred embodiment of the present invention includes the following steps:
1. Generate Binary file ARANHA.hex from the computer listing of Appendix B.
2. Decode ARANHA.hex using a MIME compliant decoder, creating aranha.tgz.

The method for providing the functionality of FIG. 6 with the program in Appendix B includes the following steps:
1. Provide a computer server such as a Dell PowerEdge 2450, with at least 1 GB of main memory, configured with OpenBSD 2.7 operating system and MySQL 3.23.25 database, and connected to the Internet.
2. Create the directory /var/www/httpd/collect.
3. Create the directory /data1.
4. In /data1 extract the file aranha.tgz by using the command 'tar xvfz aranha.tgz', creating /data1/aranha/aranha.conf, /data1/aranha/capture.zip, /data1/aranha/db.def, /data1/aranha/mod_asis.so, /data1/aranha/bin/data 1/aranha/bin/broker, /data1/aranha/bin/controller, /data 1/aranha/bin/downloader, /data1/aranha/bin/downloader.real, and a skeleton image directory /data1/aranha/images.
5. Edit the file /data1/aranha/aranha.conf, replacing the string <SERVER_IP_ADRESS> with the server's IP address, the string <DBUSER> with a MySQL username that have full access to database named DATA, and the string <DBPASSWORD> with the password of that user.
6. Create the MySQL database, and initialize it by running the MySQL script /data1/aranha/db.def.
7. Set the environment variable ARANHA_CONF to /data1/aranha/aranha.conf.
8. Execute, in the background, the program /data1/aranha/bin/broker.
9. Install the apache module mod_asis.so by changing directory to /data1/aranha, and executing the command 'apxs -a -i mod_asis.so'.
10. Set the handle_asis as the Apache web server handler for files with suffix '.y'.
11. Start the Apache web server.
12. Provide a computer server such as a Dell PowerEdge 2450, with a display adapter capable of displaying a resolution of 1600×280×32, such as an ATI ALL-IN-WONDER 128 32 MB PCI, and an ethernet adapter such as a Netgear FA310TX, configured with Windows NT Workstation 4.0 SP4, connected via Ethernet to the computer server provided in step 1.
13. Transfer the file data1/aranha/capture.zip to the computer server provided in step 12.
14. Extract capture.zip using a WinZip 7.0 compliant decoder, to the directory c:\appl.creating c:\appl\_ISource.dll, c:\appl\CaptureWeb.exe, c:\appl\CaptureWeb.ini, c:\appl\Mfc42d.dll, c:\appl\Mfcn42d.dll, c:\appl\Mfco42d.dll, c:\appl\Msvcrtd.dll, c:\appl\runCaptureWeb.exe.
15. Edit the File c:\appl\CaptureWeb.ini replacing the string <SERVER_IP_IP_ADDRESS> with the IP address of the OpenBSD server as provided by Step 1.
16. Execute the application c:\appl\runCaptureWeb.exe.
17. Create a list of hostnames the thumbnail of their home pages is to be created, and store in the file /tmp/list.
18. Execute the application /data1/aranha/bin/controller to download the thumbnail images of hosts listed in /tmp/list by running the command '/data1/aranha/bin/controller/tmp/list'.

Another preferred method for constructing A Framework For Providing Visual Context To WWW Hyperlinks in accordance with a preferred embodiment of the present invention includes the following steps:
1. Generate Binary file IMAGE.hex from the computer listing of Appendix C.
2. Decode IMAGE.hex using a MIME compliant decoder, creating image_server.tgz.

The method for providing providing the functionality of an image server of FIGS. 1 and 2 includes the following steps:
1. Provide a computer server such as a Dell PowerEdge 2450, with at least 1 GB of main memory, configured with OpenBSD 2.7 operating system, MySQL 3.23.25 database, and an image database created by the software provided in Appendix B, and Connected to the Internet.

2. Extract the binary file of Appendix C using the command 'tar xvfz image_server.tgz', creating the directories image_server and image_server/errs, and the files image_server/aranha.conf, image_server/mod_girafa.so, image_server/errs/empty, and image_servers/errs/notFL.gif
3. Change directory to image_server
4. Install the apache module mod_girafa.so by executing the command 'apxs -a -i mod_girafa.so'
5. copy the file aranha.conf to /data1/aranha/aranha.conf
6. Create the directory /var/www/htdocs/errs
7. Copy the files errs/empty and errs/notFL.gif to /var/www/htdocs/errs
8. Start the apache web server.

It will be appreciated by persons skilled in the art that the present invention is not limited by what has been particularly shown and described hereinabove. Rather the scope or the present invention includes both combinations and subcombinations of the various features described hereinabove as well as variations and modifications which would occur to persons skilled in the art upon reading the specification and which are not in the prior art.

The invention claimed is:

1. An Internet information system comprising:
  a web server; and
  an image server separate from said web server, wherein said image server employs an image storage for storing images of web pages, wherein at least one image of a web site is generated and stored in said image storage in advance of said image server receiving any request for an image of said web site,
  said web server serving code defining a first web page including a hyperlink to a second web page,
  said code including commands operable to retrieve an image of a third web page from said image server,
  said image of a third web page corresponding to said hyperlink to a second web page.

2. A system according to claim 1 and wherein said third web page is the same as said second web page.

3. A system according to claim 1 and wherein said third web page is different from said second web page.

4. A system according to claim 3 and wherein a URL of said third web page is a portion of a URL of said second web page.

5. A system according to claim 4 and wherein said URL of said third web page is a top level URL of a host of said second web page.

6. A system according to claim 3 and wherein said third web page is a home page for said second web page.

7. A system according to claim 1 and wherein said image of a third web page is a snapshot of said third web page.

8. A system according to claim 1 and wherein said image of a third web page is in a bitmap form.

9. A system according to claim 1 and wherein said image of a third web page is resized to be smaller than said third web page.

10. A system according to claim 1 and wherein said image server comprises a first database containing images of web pages.

11. A system according to claim 10 and wherein said image server further comprises a second database containing URLs of web pages the images of which are contained in said first database.

12. A system according to claim 10 and wherein said first database stores said images of web pages in a directory structure on a file system.

13. A system according to claim 11 and wherein said second database is a relational database.

14. A system according to claim 1 and further comprising a plurality of downloaders.

15. A system according to claim 14 and wherein said plurality of downloaders includes at least three downloaders.

16. A system according to claim 1 and further comprising at least one computer that downloads web pages and renders them to a predetermined size.

17. A system according to claim 16 and wherein said predetermined size is smaller than the original size of said web pages.

18. A system according to claim 1 and wherein said code also includes commands operable to display said image of a third web page within said first web page.

19. A system according to claim 1 and wherein said code also includes commands operable to display said image of a third web page alongside said first web page.

20. A system according to claim 1 and wherein said code also includes commands operable to display said image of a third web page alongside said hyperlink to a second web page.

21. A system according to claim 1 and wherein said code also includes commands operable to display said image of a third web page above said hyperlink to a second web page.

22. A system according to claim 1 and wherein said code also includes commands operable to receive user selection of said hyperlink to a second web page.

* * * * *